June 30, 1953  H. C. NETTE  2,643,844
VERNIER CONTROL AND PIVOT MOUNTING
FOR TRANSITS AND LIKE INSTRUMENTS
Filed July 12, 1948  4 Sheets-Sheet 2
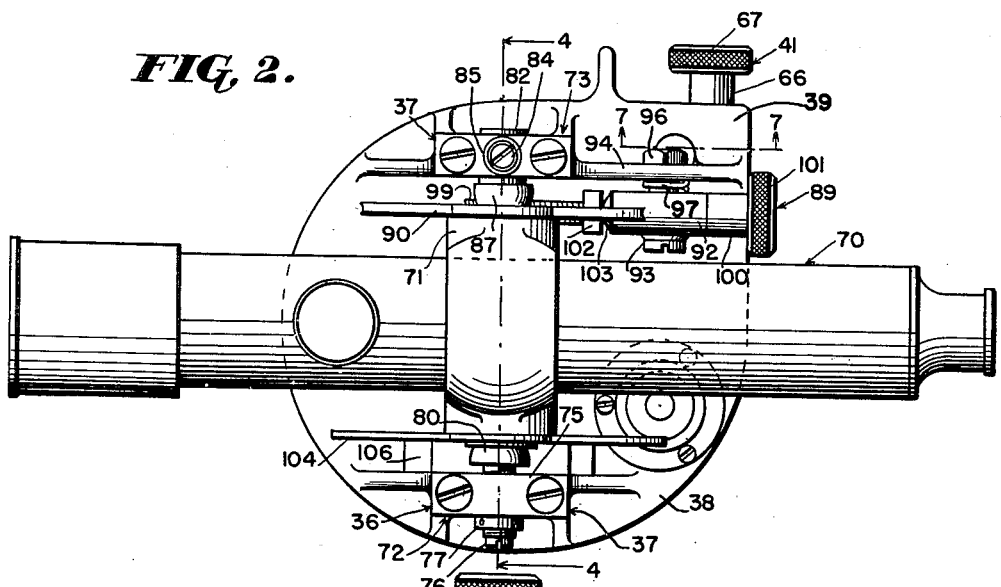
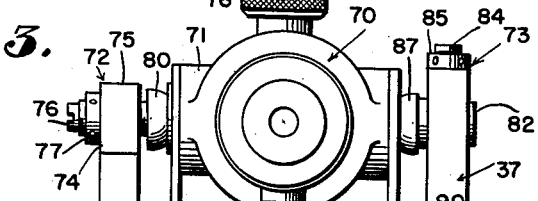
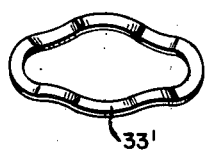
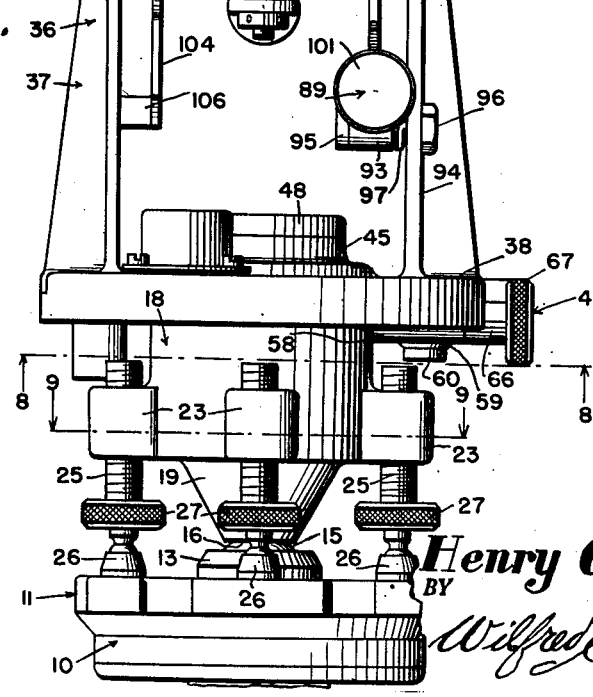
INVENTOR.
Henry C. Nette
BY
Wilfred E. Lawson June 30, 1953  H. C. NETTE  2,643,844
VERNIER CONTROL AND PIVOT MOUNTING
FOR TRANSITS AND LIKE INSTRUMENTS
Filed July 12, 1948  4 Sheets-Sheet 3
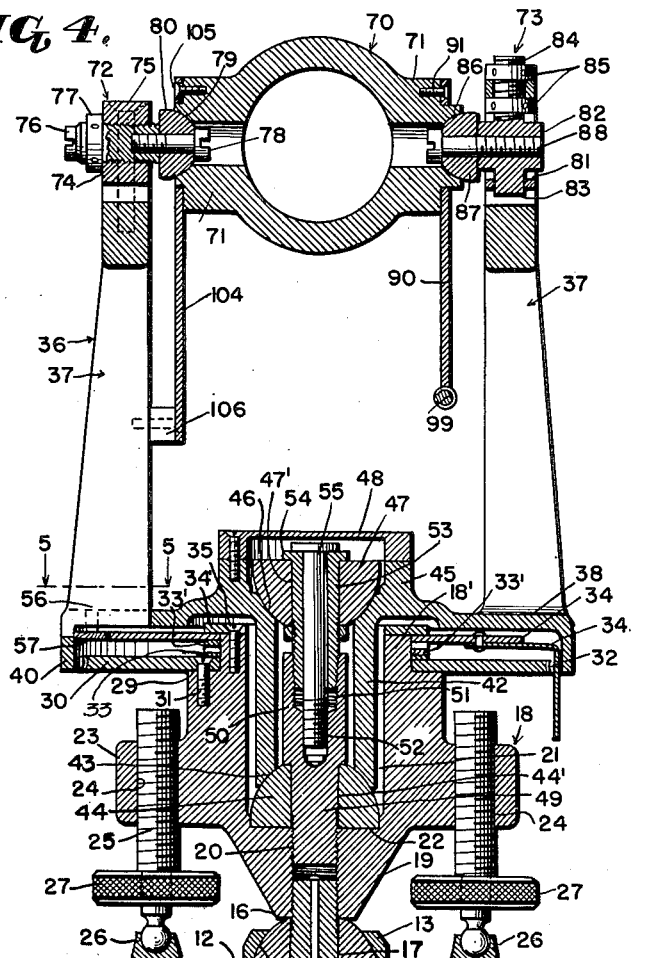
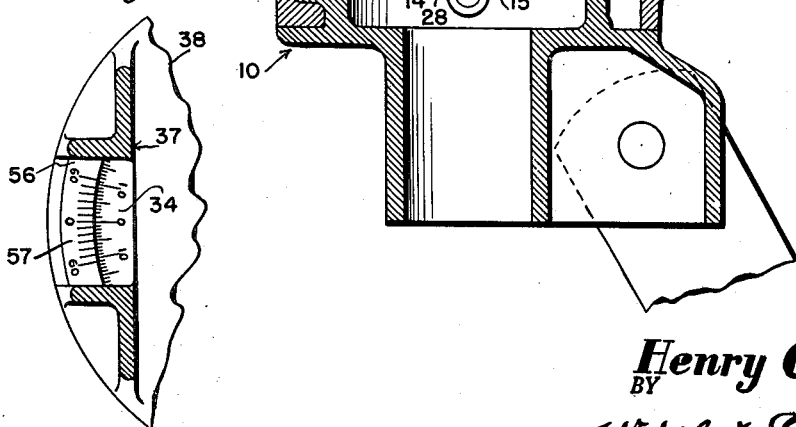
INVENTOR.
*Henry C. Nette*
BY
*Wilfred E. Lawson*
ATTORNEY

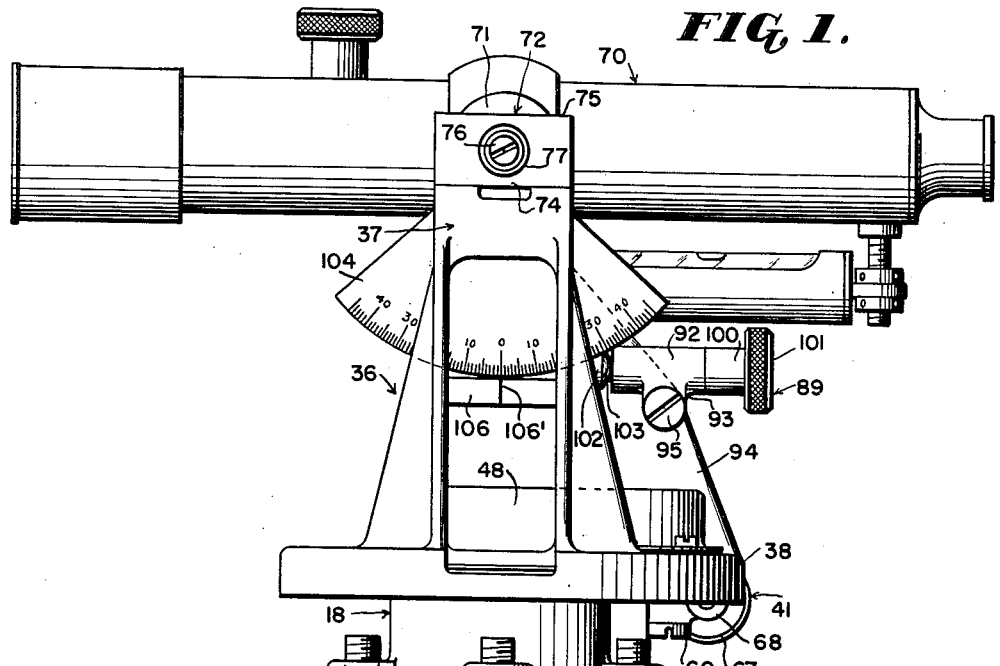
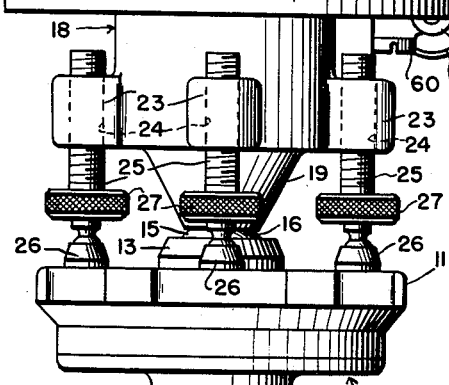

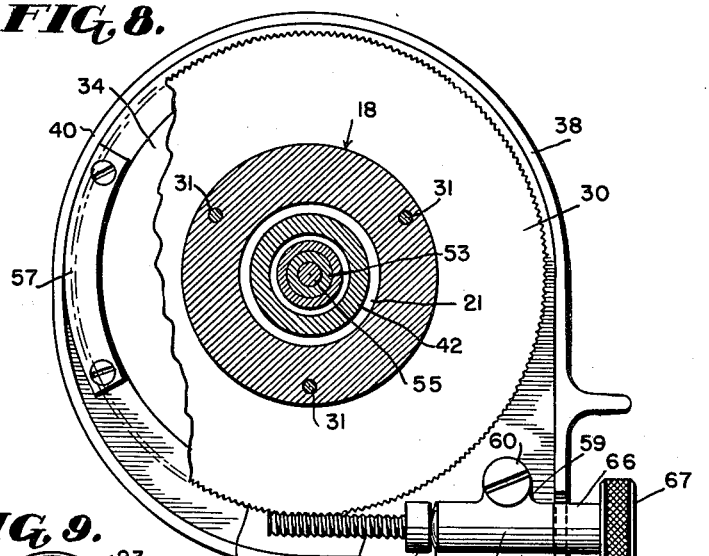
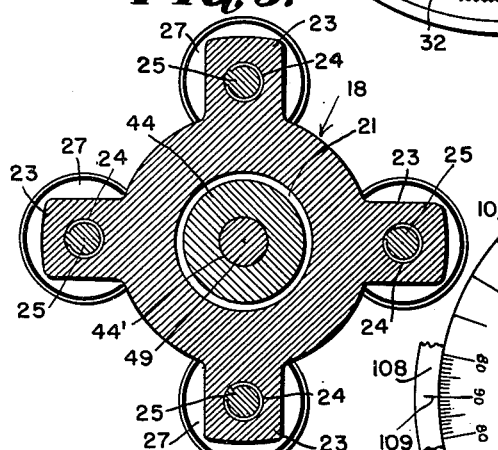
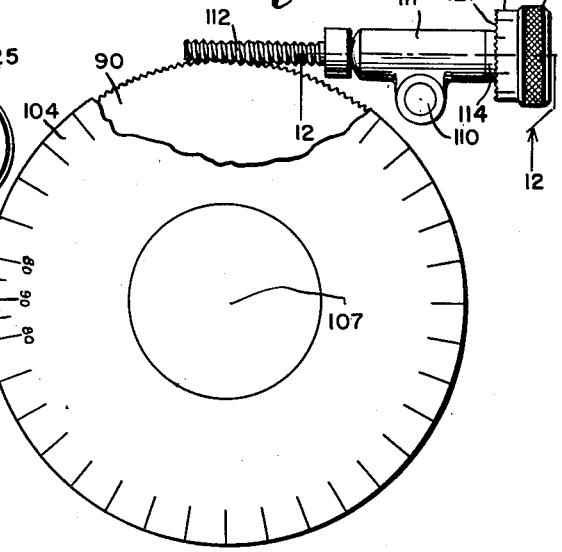
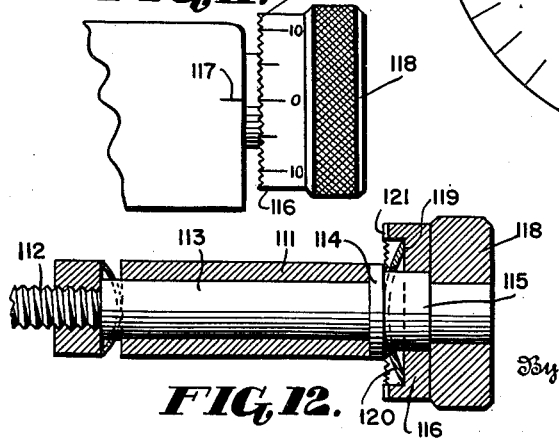

Patented June 30, 1953

2,643,844

UNITED STATES PATENT OFFICE 2,643,844

VERNIER CONTROL AND PIVOT MOUNTING FOR TRANSITS AND LIKE INSTRUMENTS

Henry C. Nette, Pasadena, Calif.

Application July 12, 1948, Serial No. 38,335

10 Claims. (Cl. 248—180)

This invention relates to improvements in geometrical instruments of the light ray type, more particularly transits and is directed specifically to improvements in vernier controls for the rotation of the transit both horizontally and vertically.

A principal object of the present invention is to provide an improved vernier control whereby, when it is desired to swing the transit freely the vernier screw may be shifted for disengagement from the gear with which it is normally connected thereby releasing the gear for free rotation together with the parts with which it is connected.

Another object of the invention is to provide an improved vernier control of the character above stated which is spring loaded or controlled whereby upon release of the vernier screw it will automatically return to its position of engagement with the gear, ready for use.

Still another object of the invention is to provide in an instrument of the character stated an improved mounting for the telescope standard, standard plate, leveling head and associate parts upon the tripod plate whereby through such mounting the parts are securely clamped and held against relative movement.

A still further object of the invention is to provide in an instrument of the character stated improved bearings between movable parts with novel means for tightening such bearings to prevent play and looseness between coupled parts.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of a transit, in the structure of which are incorporated the features of the present invention.

Figure 2 is a view in top plan of the same.

Figure 3 is a rear elevation of the instrument.

Figure 4 is a vertical transverse section taken substantially on the line 4—4 of Figure 2.

Figure 5 is a detail section taken substantially on the line 5—5 of Figure 4.

Figure 6 is a view in elevation of the top right hand side of the instrument, portions being broken away and also showing portions of the vernier screw in section.

Figure 7 is a sectional detail taken substantially on the line 7—7 of Figure 2.

Figure 8 is a horizontal section taken substantially on the line 8—8 of Figure 3.

Figure 9 is a horizontal section taken substantially on the line 9—9 of Figure 3.

Figure 10 is a detail illustrating a modification of the vernier screw employed for turning the instrument in a horizontal plane and showing an improved method of reading minute angles.

Figure 11 is a detail view on an enlarged scale of the vernier screw drum and a portion of the base in association with which it functions.

Figure 12 is a detail section taken substantially on the line 12—12 of Figure 10.

Figure 13 is a detail view illustrating the spring or friction washer by which the horizontal degree scale is held in position.

Referring now more particularly to the drawing the numeral 10 generally designates the head unit of a tripod of the type commonly employed for supporting surveying instruments, which head is connected by suitable pivots with three supporting legs, not shown.

Removably secured to the tripod head is the tripod plate 11.

In the center of the plate 11 is formed the opening 12 through which extends upwardly the bearing shell 13 which is secured to the tripod plate in a suitable manner as shown. This bearing shell has the interior surface 14 formed to provide the socket for the reception of the bearing knuckle 15 which is in the form of hemisphere which has a flat top surface 16 which is perpendicular to the axis of the passage 17 which extends radially through the bearing knuckle.

The numeral 18 generally designates the leveling head for the instrument. This head has a central downwardly tapering foot 19 which rests upon the flat surface 16 of the bearing knuckle as shown and this foot portion 19 has a threaded bore extended axially therethrough as indicated at 20, which bore opens into and is concentric with the axial chamber 21 which actually constitutes a continuation of the bore 20, of materially greater diameter. There is thus provided at the bottom of the chamber 21 the floor 22 through the center of which the threaded bore 20 opens.

The leveling head also includes as an integral part thereof, radially extending ears 23 which are customarily four in number and through each of which is formed a threaded passage 24 which parallels the bore 20. These ears lie above and are spaced from the tripod plate 11 and each has threaded therein the leveling screw 25 which at its lower end has the ball and socket connection with the top of the tripod plate 11 as indicated at 26, whereby when the leveling screws are suitably rotated through the medium of an attached nut 27 desired movement and consequent leveling, of the head 18 is obtained.

The head 18 is coupled with the bearing knuckle 15 by the threaded screw or stud 28 which engages in the threaded bore 20 of the leveling head and thus firmly connects the head with the bearing knuckle.

The leveling head is reduced in diameter at its top end whereby there is formed an encircling shoulder 29 and resting upon this shoulder is a gear plate 30, the center of which is apertured to receive the reduced upwardly extending portion 18' of the leveling head. This plate is secured to the shoulder 29 by screws 31 or the like.

The periphery of the gear plate 30 is provided with the transverse worm threads 32.

Encircling the reduced portion 18' of the leveling head and resting upon the gear plate 30, is a collar 33. Overlying and resting upon this collar 33 is a corrugated or wrinkled spring washer 33' and resting upon this washer and encircling the portion 18' of the head is the degree disk 34, the overall diameter of which is somewhat less than the diameter of the gear plate 30 over which it lies.

The degree disk 34 is pressed down against the spring washer 33 and firmly held against accidental rotary movement around the adjacent portion of the head, by the cap ring 34' which is firmly secured in position by the screws 35, as shown in Figure 4. By this means the degree disk will not move from its position on the head unless manually shifted.

In order to facilitate the turning of the degree disk around the reduced portion of the head, the disk has secured thereto the angular member 34a, a portion of which extends downwardly across the periphery of the gear 30 as shown to provide a finger piece.

As will be readily seen upon reference to Figure 5 the top of the degree disk 34 is laid off or calibrated around the periphery of the disk in the degrees of a circle whereby this disk cooperates with a stator scale hereinafter described.

The numeral 36 generally designates the telescope supporting frame which is rotatably mounted on the leveling head 18 and which comprises the two spaced parallel upstanding A-standards 37 mounted upon or formed integral with the standard plate 38. This plate 38 is circular through three quarters of its circumference and in the fourth quarter it has its side edges continued from two points spaced 90° apart, tangential to the circle to form the square corner portion 39. The standard plate has a depending flange or skirt 40 and in this corner portion there is provided a box in which is housed the horizontal angle vernier screw which is generally designated 41.

Formed integral with the standard plate 38 at the center thereof, is the downwardly extending hub 42 which is hollow or tubular as shown and which is of a diameter to extend into the axial chamber 21 of the leveling head. The lower end of this hub has the inner edge milled or reamed out to provide a curved bearing surface 43 to rest upon the correspondingly curved surface of a hemispherical foot bearing 44. This bearing 44 which is formed in the same manner as the bearing ball or knuckle 15, rests upon the bottom or floor 22 of the chamber 21 as shown.

Coaxial with the hub 42 and extending upwardly from and above the standard plate 38 is a circular cup 45 having an annular or circular inner bearing surface 46 for a head bearing 47 which is also of hemispherical form and has its curved or rounded surface directed downwardly in opposition to the rounded surface of the foot bearing 44. The top of this cup is covered by a cap 48.

The opposing bearings 44 and 47 are provided with radial bores or passages 44' and 47' respectively and extending through the bore 44' of the foot bearing is a screw 49. The lower end of this screw 49 is threaded for engagement in the threaded bore 20 of the foot 19 while the part lying in the bore 44' of the foot bearing is unthreaded for free turning movement therein. The upper end of the screw 49 has a long cylindrical head 50 which lies within the hub 42 and this head has therein the coaxial tapped bores 51 and 52. The tapped bore 51 extends into the head from the outer end partway through the length of the head and is continued at its inner end in the smaller tapped bore 52.

Extending through the radial bore 47' of the head bearing is a sleeve bolt 53 which has a collar 54 at its outer end which bears upon the top of the head bearing while the inner end, which is externally threaded, threads into the larger top bore 51 of the bolt 49.

Extending through the sleeve bolt 53 is the headed pin 55, the head upon the outer end of which rests upon the flange 54 of the sleeve bolt while the inner end which is screw threaded, is secured in the tapped bore 52.

Thus from the foregoing it will be seen that the telescope supporting frame or unit 36 is mounted in a unique manner upon the leveling head 18 whereby it may be readily rotated in a horizontal plane but is firmly held against tipping or movement from such plane.

Upon one side of the standard plate there is formed the recess or opening 56 and secured to the underside of the standard plate to be viewed through this recess is a fixed vernier 57, the inner edge of which is curved to conform to the peripheral curve of the degree disk 34 against which it lightly rests. It is also in the same plane as the degree disk so that the degrees can be readily noted against the fixed scale as the standard plate is rotated.

Rotation of the standard plate is effected by the unit 41 which, as previously stated, is housed in the corner box of the standard plate. This unit comprises a sleeve 58, upon one side of which is formed a bearing 59 which is perpendicular to the axis of the sleeve and through which extends the pivot screw 60 which is secured, from the underside, in the standard plate 38. This supports the sleeve 58 beneath the standard plate and in parallel relation with the under surface thereof.

Encircling the pivot screw 60 between the bearing 59 and the adjacent standard plate 38, is a spring 61. This spring is turned or wound around the screw 60 and has one end fixed in the standard plate as indicated at 62 while the other end is fixed, as indicated at 63, in the bearing 59.

Extending through and rotatably supported in the bearing sleeve 58, is a long screw shank 64 which at its inner end is of reduced diameter and threaded to provide a screw 65, the teeth of which mesh with the teeth 32 of the adjacent gear wheel or plate 30. The outer end of the screw shank 64 has the collar 66 which bears against the outer end of the bearing sleeve 58 and integral with this collar is the knurled head 67.

The spring 61 is biased to effect the turning of the bearing sleeve 58 in a direction to constantly urge the screw 65 into mesh with the gear plate but room is provided in the opening in the standard plate flange 49 through which the collar portion of vernier screw passes, to permit the screw and the bearing sleeve to be oscillated slightly against the tension of the spring 61 to effect the disengagement of the vernier screw 65 from the teeth 32.

At the inner end of the bearing sleeve 58 the screw 65 has mounted thereon the collar 68 and between this collar and the adjacent end of the bearing sleeve 58 is a spring 69 which normally urges axial movement of the vernier screw to maintain the outer collar 66 firmly against the outer end of the bearing sleeve.

The numeral 70 generally designates the telescope which has opposite trunnions 71 and which is oscillatably supported between the upper ends of the standards 37 by bearings or bearing units 72 and 73.

One of the bearing units, here designated as the unit 72, comprises a block 74 having extending therethrough and threadably joined thereto the axle 76 which is secured and maintained in position by the lock collar 77.

The inner end of the axle 76 is drilled and tapped to receive the bearing ball securing screw 78 and the adjacent trunnion 71 of the telescope is recessed or socketed as indicated at 79 to receive the spherical surface of the bearing knuckle or ball 80 through which the securing screw passes radially and whereby such knuckle is firmly connected to the inner end of the axle 76.

The upper end of the standard which supports the bearing unit 73 is formed to provide a frame 81 in which is slidably mounted for vertical movement, the adjustable bearing block 82.

The block 82 has a lower guide pin 83 and an upper threaded guide pin 84, which pins pass through openings in adjacent parts of the frame and the upper pin 84 carries above and below the part of the frame through which it passes, the lock nuts 85.

The trunnion 71 adjacent to the bearing 73 is formed in the same manner as the opposite trunnion, that is, with the outwardly opening socket which is here designated 86 and which is designed to receive the spherical surface of the ball knuckle bearing 87 and extending radially through this bearing knuckle 87 is a securing screw 88 which is threaded into the block 82 as shown, whereby to hold the bearing knuckle or ball 87 firmly against the inner side of the block with its spherical surface positioned to engage in the socket 86 of the adjacent telescope trunnion.

The vertical angle of the telescope tube is controlled by a vernier screw unit which is generally designated 89 and a sector gear 90. The gear sector 90 is secured to one of the telescope trunnions 71 as shown, by screws 91 or in any other suitable means and is concentric with such trunnion and extends downwardly or depends therefrom when the telescope 70 is in horizontal position.

The vertical angle vernier screw unit 89 is of similar construction to the unit 41 and comprises the bearing sleeve 92 with which is integrally formed the right angularly disposed bearing 93. This bearing 93 is disposed upon the inner side of and in a plane perpendicular to a portion of the standard 37 adjacent to which the sector 90 is positioned such for example, as the web 94 which extends along one side of the standard, such web being provided with a suitable opening for the passage therethrough of the pivot screw 95. This screw is held in place by the nut 96 and interposed between the web 94 and the adjacent end of the bearing 93 is a coil or twist spring 97, one end of which is secured to the adjacent web while the other end is secured to the bearing in a manner similar to the screw 61. This spring 97 imparts necessary turning thrust to the bearing sleeve 92 to move the vernier screw into contact with the toothed periphery of the screw sector 90.

The vernier screw of the unit 89 comprises the smooth shank portion 98 which is rotatably mounted in the bearing sleeve 92 and extending from one end of this shank is the threaded portion 99 which has toothed connection with the screw sector 90 as shown in Figure 6. The screw and the bearing sleeve 92 lie across the top of the bearing 93 and the pivot screw 95 so that when the screw is horizontal it will be tangent to the edge of the sector 90 and in driving connection therewith.

At the opposite end of the shank 98 from the threaded portion 99, is a shouldered portion 100 which bears against the adjacent end of the bearing sleeve 92, which shouldered portion is integral with the knurled head 101.

Upon the threaded portion 99 of the screw is fixed the collar 102, corresponding to the collar 68 and interposed between this collar and the adjacent end of the bearing sleeve 92 is a spring element 103 which holds the vernier screw against axial movement in its bearing.

In the opposite side of the telescope 70 from the gear sector 90 is a degree scale sector plate 104. This degree scale sector plate is secured concentric with the telescope trunnion, in any suitable manner, as by the use of screws or the like as shown at 105.

Cooperating with the degree scale sector is a zero point indicator which is in the form of a straight plate or bar 106 which is secured across the two legs of the adjacent A-standard 37 with the centering mark 106' in the vertical line of the center of turning or rotation for the telescope 70 as shown in Figure 1.

It will be seen from the foregoing that when it is desired to make a quick rough adjustment of the inclination of the telescope 70 this can be accomplished rapidly by pressing upwardly on the knurled knob 101 of the vernier screw unit 89 thereby oscillating the screw against the tension of the control spring 97 to disengage the screw from the vernier screw sector 90. The desired angular adjustment of the telescope can then be made and upon releasing the vernier unit 89 the screw end 99 thereof will be immediately returned by the screw 97 into toothed engagement with the sector 90 whereupon the desired finer adjustment of the angle may be accomplished by rotating the screw 99.

Figures 10 to 12 illustrate a modified construction for the vernier screws and provide an improved method of reading minute angles on the transit. It will be understood that this improved construction will be used for both horizontal and vertical angles and may be used in substitution for the vernier screws hereinbefore described.

In the illustration of the minute reading vernier screw, the point 107 designates the radial center for either the horizontal angle or vertical angle degree disk and gear or degree sector and screw sector, which elements are here designated by the reference characters 34—104 and 30—99 respectively.

Either the degree dial 34 or degree sector 104 is associated with a fixed element 108 having noted thereon a single zero or setting point 109 in association with which the degrees are read.

The minutes are read in association with the vernier screw modified in the manner about to be described. In this modified screw construction the numeral 110 designates the pivot screw around which the vernier screw is oscillated when the screw is to be disengaged from the gear disk or sector. The bearing sleeve for the vernier is designated 111 and the vernier screw is designated 112. The shank portion 113 of the screw lies within the bearing sleeve 111 and carries upon the end remote from the screw 112 a collar 114 which bears against the adjacent end of the bearing 111.

Upon the side of the collar 114 remote from the bearing 111 the shank has the arbor 115 formed on which is mounted for free rotation the drum 116, the peripheral surface of which is graduated or scaled for reading minutes in association with a starting or zero point 117 located on an adjacent fixed part of the instrument.

Secured upon the outer end of the screw shank as by means of a press fit or in any other suitable manner, is the knurled knob 118 against the underside of which the minute drum 116 contacts.

The inner or underside of the minute drum is provided with the recess 119 which surrounds the central opening therein and in this recess is housed the spring washer 120 which bears against the collar 114 and urges the minute drum outwardly for contact with the knob 118. Sufficient frictional contact is thus obtained between the drum and the screw head to cause the drum to be rotated with the head but if independent rotation of the drum is desired this can be readily effected and to facilitate this the inner surface of the drum around the spring recess 119 is roughened or knurled as indicated at 121.

It will be understood that the modified construction of the vernier screw may be used in place of the vernier screw 41 and by the employment of the spring washer 33' and the spring washer 120, both the vernier screw, minute dial or drum and the degree disk or sector are friction controlled. Consequently while the drum 116 will rotate with the screw head 118 as will be readily apparent and the degree disk 34 is frictionally held in position by the spring washer 33', the drum 116 may be manually turned independently of the screw head 118 when desired and, by the provision of the angled finger piece 34a the degree disk 34 may also be turned manually if and when desired to a new zero position or prime reading.

The gears 30 and 90 with which the vernier screws have toothed connection, are provided with 360 teeth whereby one complete turn of the vernier screw may be made to impart one compass degree turn to the gear or to the instrument with respect to the gear.

I claim:

1. In a transit construction of the character described, including a tripod plate, a leveling head, the leveling head having a central downwardly extending foot, a half ball bearing disposed beneath and supporting the foot and having rotational connection with the tripod plate, means connecting the tripod plate and leveling head together facilitating leveling of the head with respect to the plate, said leveling head having an upwardly opening chamber, a standard plate having a tubular hub adapted to extend into said chamber coaxially therewith, a pair of half ball bearings at the upper and lower ends of the hub and having their circular faces in opposed relation, the lower one of the half ball bearings resting upon the bottom of said axial chamber, and means passing through the half ball bearings and through the hub and drawing said bearings together, said last means being secured in said foot.

2. A transit structure of the character stated in claim 1, with a gear plate secured horizontally upon the upper end of the leveling head and concentric with said hub, means carried by the standard plate and connected with said gear for establishing a driving connection between the standard plate and the gear for the rotation of the standard plate, a degree circle carrying disk secured to the leveling head above the gear and concentric therewith, and a vernier carried by the standard plate for coaction with the degree circle of the disk.

3. In a transit construction of the character set forth including a tripod plate, a leveling head supported on the tripod plate and having a central vertical body portion provided with an axial, upwardly opening chamber, a standard carrying plate disposed over the leveling head, a hub carried by the standard plate and disposed vertically in said chamber, a bearing member in the bottom of said chamber upon which the hub rests, and a connecting means between the hub and the leveling head passing axially through the hub and leveling head.

4. In a transit construction of the character set forth including a tripod plate, a leveling head supported on the plate, a standard carrying plate disposed over the leveling head, the said leveling head having a central vertical body portion provided with an axial, upwardly opening chamber, a long hub member carried by the plate and extending into said chamber, bearing means between the bottom of the chamber and the lower end of the hub facilitating the turning of the hub and plate, said body portion being provided at its top with a shoulder concentric with the chamber, a gear plate having a central opening in which the upper part of the body portion is received, the gear plate resting upon said shoulder, means carried by the standard plate for engaging the gear to facilitate turning the plate relative to the leveling head, and a coupling means extending axially through the hub member between the upper end of the hub member and the leveling head.

5. In a transit construction of the character described including a tripod plate, a leveling head supported thereon, said head having a vertical, upwardly opening axial chamber therein, a standard carrying plate disposed over the leveling head, a tubular hub carried by the plate and extending down into said chamber, means between the lower end of said hub and the bottom of the chamber providing a bearing, and a coupling passing axially through the tubular hub and connecting the plate at the upper end of the hub with the leveling head below the chamber.

6. A transit construction of the character stated in claim 5, in which said bearing is in the form of a ball and socket.

7. A transit construction of the character stated in claim 5, in which said bearing comprises a semi-spherical ball lying upon the bottom of the chamber with the rounded side uppermost and a bearing seat in the lower end of the hub receiving the rounded surface of the ball.

8. In a transit construction of the character described including a tripod plate, a leveling head supported thereon, said head having a vertical, upwardly opening axial chamber therein, a standard carrying plate disposed over the leveling head, a tubular hub carried by the plate and extending down into said chamber, the upper and lower ends of the hub being formed to provide oppositely facing bearing sockets, a bearing member at the upper and lower ends of the hub and each having a rounded surface engaging in a bearing socket, the lower one of said bearing members resting on the bottom of said chamber, and a coupling between the upper bearing member and the leveling head below the chamber and extending axially through the hub and the lower bearing member.

9. A transit construction of the character described in claim 8, wherein the said coupling between the upper bearing member and the leveling head comprises a screw having an upper end portion lying within the hub and a lower end portion passing freely through the lower bearing member and threadably secured in the leveling head, a sleeve bolt connected with the upper bearing member and extending downwardly into the hub and having threaded connection with said screw, and a headed pin extending through the upper bearing member and through the sleeve bolt and threadably connected at its lower end in the upper end of said screw.

10. In a transit construction of the character described, a leveling head, a standard carrying plate lying thereover, the leveling head having a top end externally reduced to provide an encircling shoulder, the leveling head having a vertical axial chamber therein open at its top end, a hub carried by said plate and extending axially downwardly into the chamber, a thrust bearing between the lower end of the hub and the bottom of the chamber, a degree disk having a central opening receiving the reduced top end of the head, a cap ring secured to the top of the head and overlying a portion of the degree disk, the degree disk lying below the standard carrying plate, and a spring ring between the underside of the degree disk and the shoulder maintaining the disk in frictional contact with the cap ring.

HENRY C. NETTE.

References Cited in the file of this patent

UNITED STATES PATENTS

| Number | Name | Date |
|---|---|---|
| 197,369 | Hoffman | Nov. 20, 1877 |
| 282,117 | Randolph | July 31, 1883 |
| 814,292 | Hutchins | Mar. 6, 1906 |
| 1,179,271 | Berger | Apr. 11, 1916 |
| 1,182,881 | Frye | May 9, 1916 |
| 1,491,075 | Batchelor | Apr. 22, 1924 |
| 1,953,804 | Hayes | Apr. 3, 1934 |
| 1,969,697 | Kiefer | Aug. 7, 1934 |
| 2,132,170 | Langsner | Oct. 4, 1938 |
| 2,280,057 | Brunson | Apr. 21, 1942 |
| 2,424,708 | Resch | July 29, 1947 |
| 2,439,102 | Rothweiler | Apr. 6, 1948 |